Sept. 12, 1967  G. SWIFT ET AL  3,341,706
APPARATUS FOR AND METHOD OF TERRESTRIAL SURVEYING
Filed May 4, 1962

INVENTORS
GILBERT SWIFT
RALPH MONAGHAN
DALE E. BARKALOW
CHARLIE G. DENNY
ATTORNEY *Russell E. Schlott*

United States Patent Office 3,341,706
Patented Sept. 12, 1967

3,341,706
APPARATUS FOR AND METHOD OF
TERRESTRIAL SURVEYING
Gilbert Swift, Houston, Tex., and Ralph Monaghan, Dale E. Barkalow, and Charlie G. Denny, Tulsa, Okla., assignors to Dresser Industries, Inc., Tulsa, Okla., a corporation of Delaware
Filed May 4, 1962, Ser. No. 192,475
9 Claims. (Cl. 250—83.3)

This invention relates to improvements in testing, surveying and determining characteristics of terrestrial surface areas and more particularly, but not by may of limitation, to mobile or in-motion methods of testing, surveying and determining characteristics of roadway materials, ground surface layers, or subsurface layers of material contained in terrestrial surface areas.

There are many fields of construction wherein it is desirable and necessary to determine a variety of characteristics of materials contained in, or comprising substantially broad or large ground surface and subsurface areas. In roadway or highway construction, dam construction, and particularly earthen dams, airfield runway construction, and the like, it is considered necessary to determine certain data about the material which has been used in the operation during the actual construction thereof, or at various stages of completion thereof. In addition, it is often considered desirable to determine certain characteristics or states of the completed operation at various time intervals after the completion thereof. In the usual construction of roadways or highways, for example, the road bed is normally constructed in a plurality of layers, commonly called courses, each of which must be tested to determine certain necessary information with regard to the material contained in the layer prior to the laying or superimposing of the next succeeding layer thereon.

The methods in widespread use today for testing of road beds during the construction of the roadway are largely static methods wherein a series of random sample testings are conducted to determine such information as moisture content of the material, the density thereof, and the like. One common method of determining the moisture content of the material utilized in the construction of a particular roadway course is to cut into the layer of material and remove portions, or cores thereof. These samples may be weighed; baked to dry out the material, or remove the moisture therefrom; and subsequently weighed to establish the difference in weights of the two measurements in order to determine the moisture content of the original sample. In order to determine the density of the random samples, the weight of the original or dried material may be properly combined with the original volume of the removed core. Of course, throughout an extensive roadway project, it is necessary to remove many samples of the material at various locations in order that the test results adequately represent the state of the roadway. It is obvious that these methods are time consuming, and subject to many inaccuracies depending upon the number of samples tested with respect to the overall area under observation.

A more recent advancement in the testing of roadway construction is the utilization of nuclear methods for determination of moisture content and density of surface layers, such as disclosed in the Belcher et al. Patent No. 2,781,453, issued Feb. 12, 1957, and entitled Methods and Apparatus for Determination of Characteristics of Matter in a Surface Layer. This method contemplates combining a radioactive source and a detector device in a unit and disposing the "box" or unit directly on the surface of the roadway layer to be tested. The said layer is exposed to direct radiation from the radioactive source, and the back-scattered radiation from the layer is measured at the detector. A suitable source of gamma radiation is utilized in the determination of the density of the material, whereas a suitable source of neutron emission is utilized in the determination of the moisture content of the roadway material. This method is still of the static type, however, and consists of random sample readings taken by placing the "box" directly on the roadway layer at a plurality of selected position, and correlating the plurality of readings in an effort to establish an overall characteristic for the roadway material. Thus, the adequacy of the representation of the testing is dependent upon the number of sample readings taken with respect to the size of the surface area being surveyed.

The present invention contemplates a novel method of testing or surveying roadways, or the like, during the construction thereof, or upon completion thereof, to determine a variety of properties or peculiarities of the construction. The novel method comprises a continuous measurement of the relatively flat surface by moving the testing apparatus along the surface throughout the testing period. A mobile unit is provided which may be transported along the roadway or surface area being inspected in such a manner as to provide a continual recording which may be readily interpreted to ascertain the desired characteristics of the material over which it is passing. There are many properties of roadway materials that may be ascertained through mobile or in-motion means and methods. For example, nuclear means may be transported along the surface area for providing a continuous recording or charting of the moisture content and density of the material being surveyed. The advantages of providing a continuous logging or recording of substantially any desired data relating to the material or surface area being surveyed will be obvious.

It is an important object of this invention to provide a method of mobile surveying of terrestrial surface areas.

It is another object of this invention to provide a novel method of testing relatively large surface areas in-motion to provide continuous recording of substantially and desired property of the material contained within the area.

Another object of this invention is to provide a method for impinging waves or particles on the material while in motion over a terrestrial area being surveyed and receiving the emerging or returning rays, waves or particles resulting from the initial impinging action to determine a variety of characteristics of the material.

Still another object of this invention is to provide a method for establishing or determining substantially any desired data with regard to a ground area material through mobile or in-motion scanning of the test area.

Other and further objects and advantageous features of the present invention will hereinafter more fully appear in connection with a detailed description of the drawings in which.

Referring to the invention in detail, and more particularly to nuclear testing or surveying of a substantially flat area by the mobile method, a suitable radioactive source and detecting device may be carried or towed behind a vehicle adapted to move along or across the testing area at speeds of approximately two to five miles per hour, but not limited thereto. In order to achieve accurate and usable information during the moving survey over somewhat rough surfaces, it is necessary that the source and detector be carried at a suitable distance above the surface area, which may be referred to as road clearance, or the gap between the source and the surface of the ground. Substantially any gap or road clearance may be selected as determined by the practical aspects of the particular construction over which the survey is to be conducted. For example, it has been determined that a gap of approximately one inch is sufficient in most roadway conditions since the surface being surveyed is ordinarily compacted or otherwise smoothed out to provide as nearly a flat surface as possible with the particular materials of construction. However, the gap selected may be of any suitable desired size, but it is essential that the gap be maintained as nearly constant as possible throughout the surveying operation. By maintaining the gap at the selected dimension with the greatest possible accuracy or consistency, the reading of the detecting device will be substantially uninfluenced by the small irregularities of the surface, and the differences noted therein will be brought about almost entirely by the property distinctions present in the material being tested or surveyed.

Figure 4:
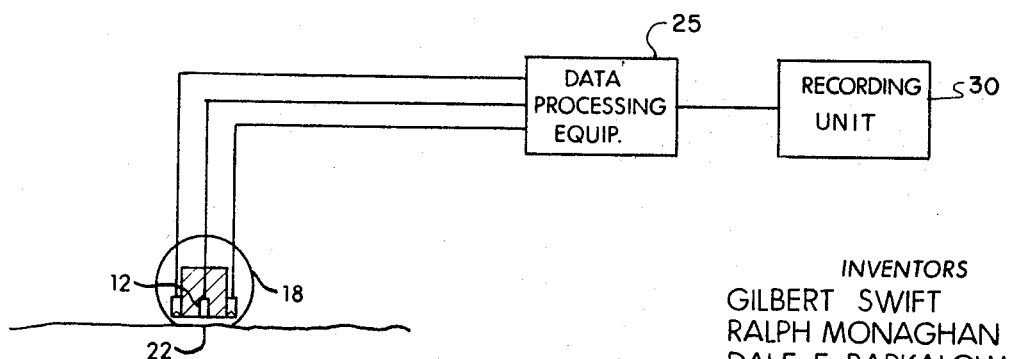
FIGURE 4 is a schematic side elevational view showing a means for compensating for variations of the spacing.

In lieu of maintaining the gap at a constant dimension, it may be desirable to monitor the gap at all times during the mobile surveying operation, and properly adjust the readings of the detecting device according to the variances in the gap to eliminate any changes in the reading resulting from differences in the spacing between the source and the surface of the testing area. This may be accomplished in many ways, such as through the utilization of suitable optic, mechanical, nuclear, sonic means, or the like, for measuring the gap and making compensation for the differences which may occur in the gap, see FIG. 4. However, it is considered that maintaining the gap at a constant dimension is more advantageous in that the readings of the detector will then not need to be corrected or changed.

Assuming that the test area comprises a roadway or highway being constructed, it is normally considered necessary to survey or test each course during the construction operation to ascertain that the properties of materials used therein meet the predetermined qualifications prior to the laying or superimposing of the next course thereon. In order to develop a unit or apparatus for achieving a surveying or testing of the desired characteristics of the various roadway courses, a suitable disposition or array for the radioactive source and detector must be established. In order to maintain a constant gap for the source and detector, it became apparent to us that the disposition of the source and detector in mutual alignment and crosswise to the roadway, or perpendicular to the direction of traverse will minimize any variations in the gap due to fluctuations of the roadway. This particular arrangement is seen to be desirable when it is noted that the most frequently occurring surface fluctuations in a roadway are transversely extending as opposed to longitudinally extending. In addition, this crosswise arrangement of the source and detector with respect to the traverse provides a scanning of an increased surface area for a given distance travelled.

It also is preferable to mount the detector and source in the plane through the axle of two wheels of a vehicle and perpendicular to the surface being surveyed. As a practical matter, a two wheel trailer, or the like, may be preferably selected. In addition, it is well to note that a relatively long tow-bar may be utilized for connecting the two wheel trailer with the towing vehicle for reducing or minimizing transfer of the vertical or angular fluctuations of the towing vehicle to the trailer.

It is also important to utilize the proper wheel or tire for the wheels which support the apparatus to obtain the most accurate results during the mobile surveying operation. It is highly desirable that the flattened area or area of contact between the tire and the roadway surface, in its length, be somewhat complementary to the length or dimension of the area of the material being investigated, said dimension being in the direction of travel, and that the total area of contact be large compared with the area of the individual grains or pieces, such as gravel, which comprise the surface and contribute to its roughness. It is also considered preferable to position the detector and source centrally or half-way between the wheels of the trailer. Here again, it may be preferable to provide a single wheel vehicle for transporting or carrying the source and detector. However, the softness of the tire in combination with the diameter thereof appears to be of utmost importance to provide the averaging effect in the mobile survey, as will be hereinafter set forth.

Figure 1:
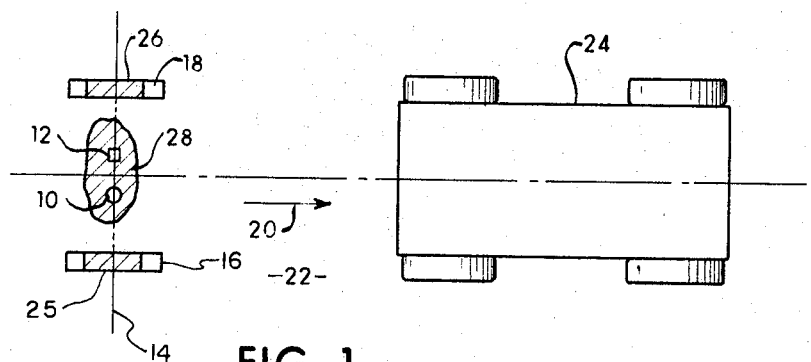
FIGURE 1 is a schematic plan view depicting a suggested arrangement for a nuclear testing of a roadway while in motion therealong.
Figure 2:
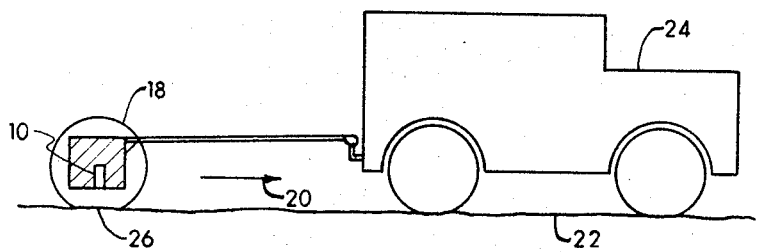
FIGURE 2 is a schematic side elevational view of the apparatus shown in FIGURE 1.
Figure 3:
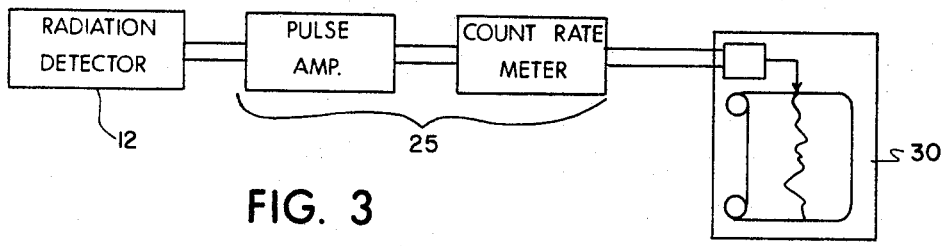
FIGURE 3 is a schematic view of the sensing device for the nuclear radiation apparatus shown in FIGURE 1.

A schematic arrangement in accordance with the aforementioned nuclear testing method is depicted in FIGURE 1 wherein a suitable radioactive source 10 is spaced from a suitable detector 12. The source 10 and detector 12 are in substantial alignment with a plane which is perpendicular to the surface 22 and passes through the axis 14 of a pair of spaced wheels 16 and 18 provided on the two wheel trailer (not shown). Of course, the wheels 16 and 18 and the source 10 and detector 12 are adapted for movement in a direction indicated by the arrow 20, and may be towed along the roadway 22 by a suitable towing vehicle 24, which may be an instrument truck provided with desirable data processing equipment and recording equipment 30 for facilitating the eventual interpretation of the data obtained from the source and detector. The wheels 16 and 18 are flattened upon contact with the roadway 22, as is well known, and the areas of contact of the wheels 16 and 18 are indicated by the shaded portion 25 and 26, respectively. The surface area of the material which principally influences the response of the detector when not in motion may be substantially elliptical in configuration, as indicated by the shaded area 28. As hereinbefore set forth, it is desirable that the length of the area 28 in the direction indicated by the arrow 20 be substantially equal to the length of the contact areas 25 and 26 of the wheels 16 and 18. This has been found to provide the most efficient and accurate survey results.

It is to be understood that the application of nuclear means is not limited to the type set forth hereinbefore. For example, a nuclear means of activation may be utilized in the in-transit method. In this instance it will be preferable to dispose the source and detector in substantial alignment in the direction of traverse whereby the surrounding surface area under surveillance may be activated by the source and the resulting activity subsequently measured by the detector or detectors, yielding information relating to the chemical constituents of the surface materials by means of their half-life.

A suitable recording unit 30 may be operably connected with the detector device 12 in any well known manner for responding to the variable data picked up or indicated by the detector. The recording device 30 may be of any suitable type, and for purposes of convenience may be carried in the towing vehicle 24. In addition to establishing a constant gap between the source-detector and the surface of the area to be investigated, and selecting the most desirable positioning for the source and detector, it is also preferable that the reading on the recording graph indicates a running average of the surveyed data. This running average may be throughout substantially any desired travelling distance, and as a practical matter, a six foot average may be found to be advantageous. This is a well known aspect of recording detected data in a graphic manner, which smoothes out variations in the data which do not persist long enough to be of importance. The recording pen may be set on the distance or position axis of the chart in such a manner that the middle of the six foot zone behind the detector is represented in order to compensate for the time lag resulting from the averaging operation. The recording of the blended six foot interval, or whatever interval is selected, also helps to diminish the effect of any rough spots in the surface of the surveyed area.

As hereinbefore set forth, the nuclear means of testing a surface area for moisture and density may be applied in a mobile method for scanning the area in a continuous survey. The nuclear principle as applied for the determination of moisture content and density of the material being tested may be accomplished while in motion, thus providing a recorded or charted representation of the desired data of substantially the entire surface area. The mobile apparatus may be moved over one section of the area under surveillance, reversed and moved back along an adjacent section of the area, and continued until the entire area has been scanned. The records or charts may be studied and analyzed, and any portions of the surveyed area which appear to be questionable, or fundamentally different from the other portions thereof may be quickly established for further study, if desired. Of course, substantially any type of further testing procedures may be applied to the questionable area or area under contemplation as being defective or substandard with respect to the predetermined characteristics or qualities.

SUMMARY

By way of summary, it is to be understood that substantially any desired properties or characteristics of the materials comprising a relatively flat and broad surface area may be ascertained by a mobile or in motion method. Nuclear methods may be adapted to the in-transit methods for surveying or scanning roadways, or the like, to provide a continuous recording and charting of the properties of the material being traversed, such as the moisture content and density thereof and chemical composition. The resulting charts may be referred to as "logs" of the traversed section, and may be interpreted in any well known manner to provide the desired information. The entire length of the roadway or area being investigated may be scanned relatively quickly to provide a continuous log thereof which will indicate any portions of the area that differ from the whole. Of course, repeated traverses of the area in adjacent sections will provide a continuous log of the entire surface area. The observed variances from the normal readings may be interpreted and any portions of the surveyed area which appear to be questionable may be subjected to additional testing, either of the mobile type, or static methods, as desired, or subjected to corrective procedures.

From the foregoing, it will be apparent that the present invention provides a novel method of surveying or testing terrestrial surface areas. The mobile methods of scanning a relatively broad surface area may be utilized in lieu of static methods, or in conjunction therewith, to provide a more facile and accurate determination of characteristics and properties of substantially any desired terrestrial surface area. Nuclear means may be applied to a mobile method of scanning the area under surveillance to provide a continuous logging thereof which may be interpreted to determine substantially any desired data relating to properties or pecularities of the materials contained in the surveyed area.

Whereas, the present invention has been described in particular relation to the drawings hereto, it should be understood that other and further modifications, apart from those shown or suggested herein, may be made within the spirit and scope of this invention.

What is claimed is:

1. A method for testing the materials forming a terrestrial surface area, which method comprises:
   producing from a source within a testing apparatus nuclear radiations of a form which will interact with the materials of the area,
   providing the testing apparatus with a detector of nuclear radiations, said detector being spaced from the source,
   spacing the portion of the testing apparatus containing the source and detector of nuclear radiations a predetermined distance above the surface of the area to be tested and separated therefrom by an air space,
   traversing the surface of the test area with the testing apparatus,
   continuously detecting and recording the interaction of the materials forming the area with the nuclear radiations thereby providing a continuous log of the area being tested.

2. A method for testing the materials forming a terrestrial surface area, which method comprises:
   producing from a source within a testing apparatus nuclear radiations of a form which will interact with the materials of the area,
   providing the testing apparatus with a detector of nuclear radiations, said detector being spaced from the source,
   spacing the portion of the testing apparatus containing the source and detector of nuclear radiations a predetermined distance above the surface of the area to be tested and separated therefrom by an air space,
   traversing the surface of the test area with the testing apparatus,
   maintaining the air space substantially constant during the traverse of the surface of the test area, and
   continuously detecting and recording the interaction of the materials forming the area with the nuclear radiations thereby providing a continuous log of the area being tested.

3. The method specified in claim 2 in which the nuclear radiations are gamma rays and the detected interactions are back scattered gamma rays whereby the continuous log provides an indication of the density of the materials forming the area.

4. The method specified in claim 2 in which the nuclear radiations are fast neutrons and the detected interactions are slow neutrons whereby the continuous log provides an indication of the hydrogenous content of the materials forming the area.

5. A method for testing the materials forming a terrestrial surface area, which method comprises:
   producing from a source within a testing apparatus nuclear radiations of a form which will interact with the materials of the area,
   providing the testing apparatus with a detector of nuclear radiations, said detector being spaced from the source,
   spacing the portion of the testing apparatus containing the source and detector of nuclear radiations a predetermined distance above the surface of the area to be tested and separated therefrom by an air space,
   traversing the surface of the test area with the testing apparatus,
   maintaining the air space substantially constant during the traverse of the surface of the test area,
   continuously detecting the interaction of the materials forming the area with the nuclear radiations,
   averaging the detected interactions over a period of time during which the testing apparatus has travelled a predetermined distance along its traverse, and
   recording the averaged interactions thereby providing a continuous log of the area being tested.

6. A method for testing the materials forming a terrestrial surface area, which method comprises:
   producing from a source within a testing apparatus nuclear radiations of a form which will interact with the materials of the area,
   providing the testing apparatus with a detector of nuclear radiations, said detector being spaced from the source,
   spacing the portion of the testing apparatus containing the source and detector of nuclear radiations a predetermined distance above the surface of the area to be tested and separated therefrom by an air space, traversing the surface of the test area with the testing apparatus, monitoring departures of the spacings from its predetermined distance during the traverse of the surface of the test area, continuously detecting the interaction of the materials forming the area with the nuclear radiations, and adjusting the detected interaction in accordance with a function of the departures of the spacing from its predetermined distance and recording the adjusted interaction to provide a continuous log of the area being tested.

7. A mobile device for testing the materials forming a terrestrial surface area, said device comprising:

a vehicle capable of traversing the surface of the area to be tested, source means on the vehicle to produce nuclear radiations of a form which will interact with the materials of the area, a detector on the vehicle spaced from the source, said detector detecting radiation resulting from the interaction of the nuclear radiation from the source with the materials, the portion of the vehicle containing the source and detector being spaced a predetermined distance from the surface and separated therefrom by an air space, means maintaining the air space substantially constant while the vehicle is traversing the area being tested, and means recording the detected interactions to provide a log of the surveyed area.

8. The device specified in claim 7 in which there is provided means to average the detected interactions over a period of time during which the device has traversed a predetermined distance and the recording means provides a record of such averaged interactions.

9. The device specified in claim 7 in which the means maintaining the air space substantially constant are soft tires having a large area of surface contact.

References Cited

UNITED STATES PATENTS

| | | | |
|---|---|---|---|
| 2,233,992 | 3/1941 | Wyckoff | 73—152 X |
| 2,545,101 | 3/1951 | Meunier | 73—71.5 X |
| 2,781,453 | 2/1957 | Belcher et al. | 250—83.6 |
| 2,833,143 | 5/1958 | Wales | 73—67.1 |
| 2,836,059 | 5/1958 | Beaujard et al. | 73—67.8 |
| 2,874,795 | 2/1959 | Doty et al. | 181—0.53 |
| 2,897,734 | 8/1959 | Bodine. | |
| 2,906,991 | 9/1959 | Camp. | |
| 2,999,936 | 9/1961 | Herzog et al. | 73—152 X |
| 3,056,209 | 10/1962 | Oliver | 73—105 X |
| 3,124,684 | 3/1964 | Eberline. | |
| 3,151,235 | 9/1964 | Greenshields | 73—105 X |

JAMES J. GILL, *Acting Primary Examiner.*

JOHN P. BEAUCHAMP, RICHARD C. QUEISSER,
*Examiners.*

C. A. RUEHL, *Assistant Examiner.*